US009778929B2

(12) United States Patent
Joo

(10) Patent No.: US 9,778,929 B2
(45) Date of Patent: Oct. 3, 2017

(54) AUTOMATED EFFICIENT TRANSLATION CONTEXT DELIVERY

(71) Applicant: Microsoft Technology Licensing, LLC, Redmond, WA (US)

(72) Inventor: Dong Kwon Joo, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/725,867

(22) Filed: May 29, 2015

(65) Prior Publication Data

US 2016/0350108 A1    Dec. 1, 2016

(51) Int. Cl.
  *G06F 9/44* (2006.01)
  *G06N 99/00* (2010.01)
  *G06F 17/27* (2006.01)
  *G06F 17/21* (2006.01)
  *G06F 17/28* (2006.01)

(52) U.S. Cl.
  CPC .............. *G06F 8/71* (2013.01); *G06F 9/4448* (2013.01); *G06F 17/21* (2013.01); *G06F 17/27* (2013.01); *G06F 17/2836* (2013.01); *G06N 99/005* (2013.01)

(58) Field of Classification Search
  CPC .............. G06F 9/4448; G06F 17/2872; G06F 17/2836; G06F 17/289; G06F 17/30985; G06F 8/71; G06F 17/21; G06F 17/27
  USPC ......................................................... 717/121
  See application file for complete search history.

(56) References Cited

U.S. PATENT DOCUMENTS

| 6,311,151 | B1 | 10/2001 | Yamamoto et al. |
| 6,871,174 | B1 | 3/2005 | Dolan et al. |
| 7,356,537 | B2 | 4/2008 | Reynar et al. |
| 7,552,046 | B2 | 6/2009 | Brockett et al. |

(Continued)

FOREIGN PATENT DOCUMENTS

| EP | 1315084 A1 | 5/2003 |
| EP | 2757487 A2 | 7/2014 |

OTHER PUBLICATIONS

Hewavitharana, et al., "Incremental Topic-Based Translation Model Adaptation for Conversational Spoken Language Translation", In Proceedings of 51st Annual Meeting of the Association for Computational Linguistics, Aug. 4, 2013, pp. 697-701.

(Continued)

*Primary Examiner* — Wei Zhen
*Assistant Examiner* — Mohammed Huda

(57) ABSTRACT

Embodiments relate to automatically providing textual context for source strings in a source language that are to be translated by a human translator to target strings in a target language. The source strings are compared against a dictionary of reference strings in the source language. For each source string, one or more of the reference strings that are most relevant, similar, etc., are selected. When a human translator is to translate the source strings, the selected reference strings are presented; each source string has one or more similar/related strings displayable in association therewith. For a given source string, the human translator can use the associated reference strings as a form of context to help estimate the intended meaning of the given source string when translating the given source string to a target string in the target language.

20 Claims, 7 Drawing Sheets

(56) References Cited

U.S. PATENT DOCUMENTS

| | | | |
|---|---|---|---|
| 7,904,291 | B2 | 3/2011 | Kamatani et al. |
| 7,925,493 | B2 | 4/2011 | Watanabe et al. |
| 7,925,494 | B2 | 4/2011 | Cheng et al. |
| 7,983,896 | B2* | 7/2011 | Ross .................. G06F 17/2836 341/107 |
| 8,050,906 | B1 | 11/2011 | Zimmerman et al. |
| 8,510,328 | B1 | 8/2013 | Hatton |
| 8,954,315 | B2 | 2/2015 | Clark |
| 2004/0049374 | A1 | 3/2004 | Breslau et al. |
| 2005/0267734 | A1 | 12/2005 | Masuyama |
| 2006/0287844 | A1* | 12/2006 | Rich ..................... G06F 17/289 704/2 |
| 2008/0133216 | A1 | 6/2008 | Togami |
| 2011/0126119 | A1 | 5/2011 | Young et al. |
| 2013/0282363 | A1* | 10/2013 | Fan .......................... G09B 7/00 704/9 |

OTHER PUBLICATIONS

Cui, et al., "Learning Topic Representation for SMT with Neural Networks", In Proceedings of 52nd Annual Meeting of the Association for Computational Linguistics, Jun. 23, 2014, pp. 133-143.
Eidelman, et al., "Topic Models for Dynamic Translation Model Adaptation", In Proceedings of 50th Annual Meeting of the Association for Computational Linguistics, Jul. 8, 2012, pp. 115-119.
Dinu, et al., "Topic Models for Meaning Similarity in Context", In Proceedings of 23rd International Conference on Computational Linguistics: Posters, Aug. 23, 2010, pp. 250-258.
Chan, Vincent, "A Step by Step Guide to Pre-Translation", Published on: Jul. 8, 2014 Available at: http://www.oneskyapp.com/blog/a-step-by-step-guide-to-pre-translation/.
Gao, et al., "Learning Continuous Phrase Representations for Translation Modeling", In Proceedings of 52nd Annual Meeting of Association for Computational Linguistics, Jun. 2014, 11 pages.
"Internationalization", Published on: Mar. 26, 2011 Available at: https://docs.djangoproject.com/en/1.3/topics/i18n/internationalization/.
"Cluster Analysis", Retrieved on: Apr. 13, 2015 Available at: http://en.wikipedia.org/wiki/Cluster_analysis.
Blei, et al., "Latent Dirichlet Allocation", Published on: Jan. 2003 Available at: http://machinelearning.wustl.edu/mlpapers/paper_files/BleiNJ03.pdf.
"Hellinger Distance", Retrieved on: Apr. 13, 2015 Available at: http://en.wikipedia.org/wiki/Hellinger_distance.
"Kullback—Leibler Divergence", Retrieved on: Apr. 13, 2015 Available at: http://en.wikipedia.org/wiki/Kullback%E2%80%93Leibler_divergence.
Blei, David, "Topic Models", In Proceedings of Pattern Analysis, Statistical Modelling and Computational Learning, Nov. 2, 2009, 3 pages.
Brücher, et al., "Document Classification Methods for Organizing Explicit Knowledge", In Proceedings of the 3rd European Conference on Organizational Knowledge, Learning and Capabilities, Aug. 2002, 26 Pages.
Gomaa, et al., "A Survey of Text Similarity Approaches", In International Journal of Computer Applications, vol. 68, Issue 13, Apr. 2013, pp. 13-18.
Hatzivassiloglou, et al., "Detecting Text Similarity over Short Passages: Exploring Linguistic Feature Combinations via Machine Learning", In Proceedings of the Joint Sigdat Conference on Empirical Methods in Natural Language Processing and Very Large Corpora, Jun. 21, 1999, 10 Pages.
Krstovski, et al., "Efficient Nearest-Neighbor Search in the Probability Simplex", In Proceedings of the Conference on the Theory of Information Retrieval, Sep. 29, 2013, 8 Pages.
"International Search Report and Written Opinion Issued in PCT Application No. PCT/US2016/031696", Mailed Date: Jul. 29, 2016, 17 Pages.
Piperidis, Stelios, "Interactive Corpus-Based Translation Drafting Tool (Translearn)", In Proceedings of Aslib, vol. 47, Issue 3, Mar. 1995, pp. 83-92.
Planas, et al., "Formalizing Translation Memories", In Proceedings of the 7th Machine Translation Summit, Sep. 1999, pp. 331-339.
Quan, et al., "Short Text Similarity Based on Probabilistic Topics", In Journal of Knowledge and Information Systems ,vol. 25, Issue 3, Sep. 17, 2009, pp. 473-491.
Renike, et al., "State of the Art in Translation Memory Technology", In Journal of Translation: Computation, Corpora, Cognition, vol. 3, Issue 1, Jun. 2013, pp. 27-48.
Steyvers, et al., "Probabilistic Topic Models", In Handbook of Latent Semantic Analysis, Jan. 2007, 15 Pages.

* cited by examiner

131

| context dictionary | |
|---|---|
| *strings/phrases in source language* | *equivalent strings/phrases in target language* |
| hello world | hola mundo |
| find the apple | encontrar la manzana |
| click here for help | haga clic aquí para obtener ayuda |
| please enter your email address | Por favor, introduzca su dirección de correo electrónico |
| ... | ... |

FIG. 3

AUTOMATED EFFICIENT TRANSLATION CONTEXT DELIVERY

BACKGROUND

Most software programs have text strings that are displayed to provide information to users. However, many software programs are intended to be used by people who speak different languages. Therefore, it is desirable to provide language-specific versions of software programs. To facilitate versions in different languages, many programming languages and software development environments provide tools to allow the displayable text strings of a program to be isolated and conveniently replaced or swapped. Typically, a software developer writes program source code and uses resource references in the source code where text strings (resource strings) are to be incorporated at compile time. The identifiers and the respective resource strings, in English, for example, are stored in a resource file. At compile time, each reference/ID in the source code is replaced with its corresponding resource string in the resource file and is embedded in the compiled program. Another more common approach, discussed below, is to reference a resource file that is loaded or accessed at run time according to a reference thereto.

If the program is to be made available for another human language—Spanish, for instance—then a Spanish-specific resource file is built. The same resource string identifiers are used for the strings in the Spanish resource file, which are translated equivalents of the English resource strings. A program project might require many such language-specific resource files, each containing semantically equivalent text strings in respective human languages for which versions of the program are desired. Any of the resource files may be used to create a corresponding language-specific program or distribution thereof.

Because software developers are usually only versant in one or a few languages, human translators are employed to translate the source resource strings (authored by the developer) to a target language. Different translators might be employed for each different language for which a resource file is needed. This arrangement may have several problems. Because a language-specific version of a program will require the services of a human translator, the process of building the language-specific version of the program can be significantly delayed while awaiting a corresponding translation. Moreover, because many resource strings are short, translation can be difficult. Lack of information about the context of a resource string (circumstances under which a user will encounter the resource string) can lead to inaccurate translations. While programmer comments can help, such comments take time to write, and for that reason they are often omitted. Screen shots of a program displaying the strings in the source language can be provided to a translator, but this also can be costly and time-consuming.

Techniques related to automated context provisioning are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments described herein relate to automatically and efficiently providing textual context for source strings in a source language that are to be translated by a human translator to target strings in a target language. The source strings are compared against a dictionary of reference strings in the source language. For each source string, one or more of the reference strings that are most contextually relevant, similar, etc., are selected. When a human translator is to translate the source strings, the selected reference strings are presented; each source string has one or more similar/related strings displayable in association therewith. For a given source string, the human translator can use the associated reference strings as a form of context to help estimate the intended meaning of the given source string when translating the given source string to a target string in the target language.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 3 shows an example of the context dictionary.

DETAILED DESCRIPTION

Figure 1:
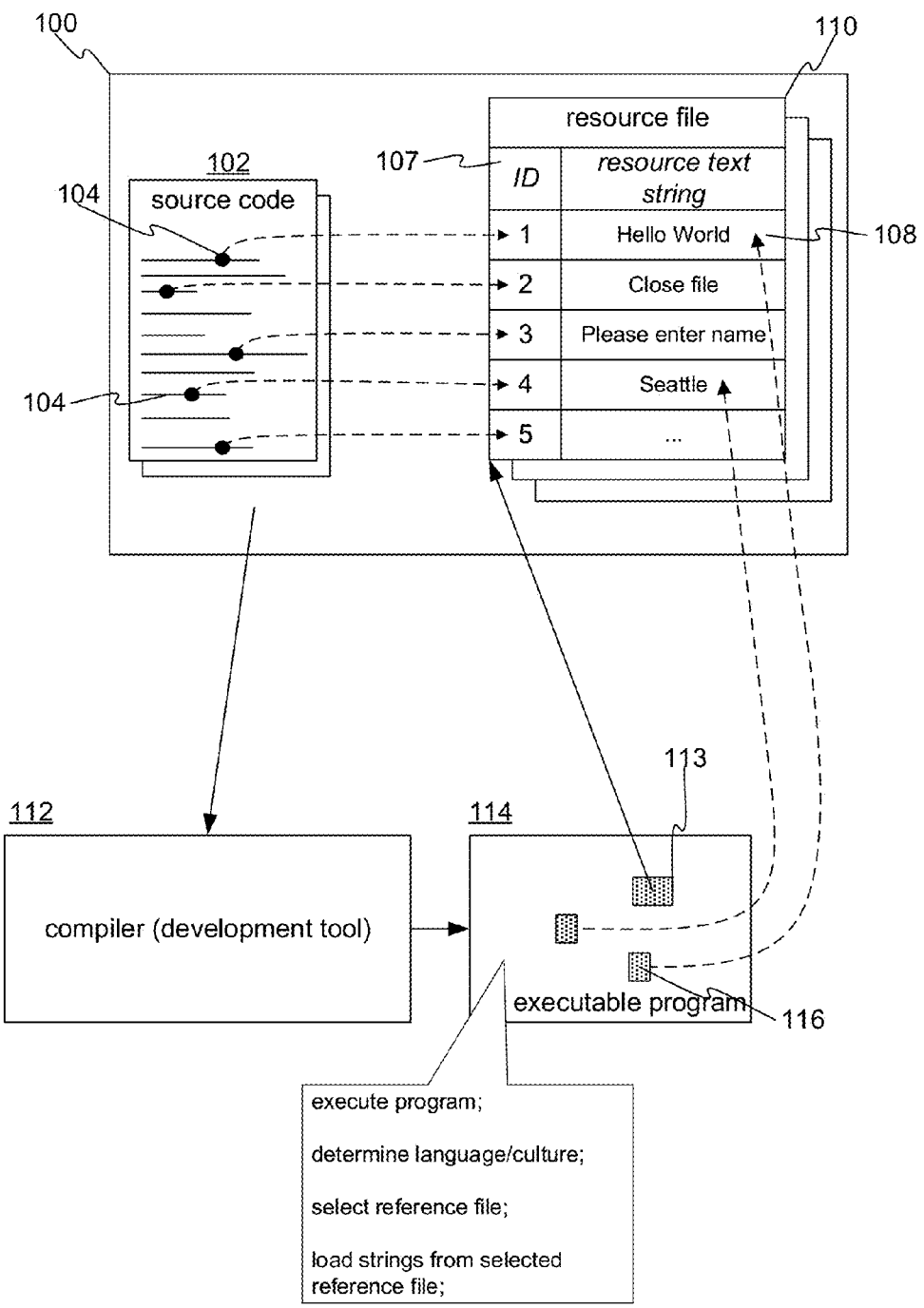
FIG. 1 shows an example of multi-language program project.

FIG. 1 shows an example of multi-language program project 100. Among other objects, the program project 100 has one or more source code files 102, for example files containing Java or C# source code. The source code file 102 is written to include references 104 to resource text strings 108. The references 104 can be in any form, for example alphanumeric identifiers 107 that are generally unique to the project 100 or source code file 102. A resource file 110 contains the identifiers 106 in association with their respective resource text strings 108. The resource file 110 can contain other types of resources and might also contain a flag or tag indicating a language or culture of the file (e.g., "Spanish"). In effect, the resource file 110 is a dictionary of the strings used in one or more of the source code files 102 in the program project 100. In one embodiment, a different resource file 110 can be provided for each human language for which the program project is to be made available. In another embodiment, a monolithic resource file can contain all of the translations of the resource text strings 106 which are labeled to identify their language. A resource file can have a variety of known forms, such as Extensible Markup Language (XML, e.g., "resx" files), hypertext markup language, flat files, etc.

A development environment and/or a compiler 112 thereof is used to build an executable program 114 which might be one or more files containing processor instructions, bytecode, virtual machine instructions, intermediate language code, etc. In one embodiment, at build time, the compiler 112 (or perhaps a pre-compiler) includes a reference 113 to a resource file 110. At runtime, the executable program 114 receives a flag or the like that indicates which language or culture (e.g., "English") is being targeted (possibly provided by the operating system or a user setting). The corresponding resource file 110 (English) is selected, the references 104 in the source code file 102 are used to load the respective resource text strings 108. In one embodiment, the executable program 114 does not actively select a resource file, but instead uses whichever version of the resource file happens to be in place. Other methods for compiling or configuring culture-specific or language-specific programs are known and may be used instead.

Figure 2:
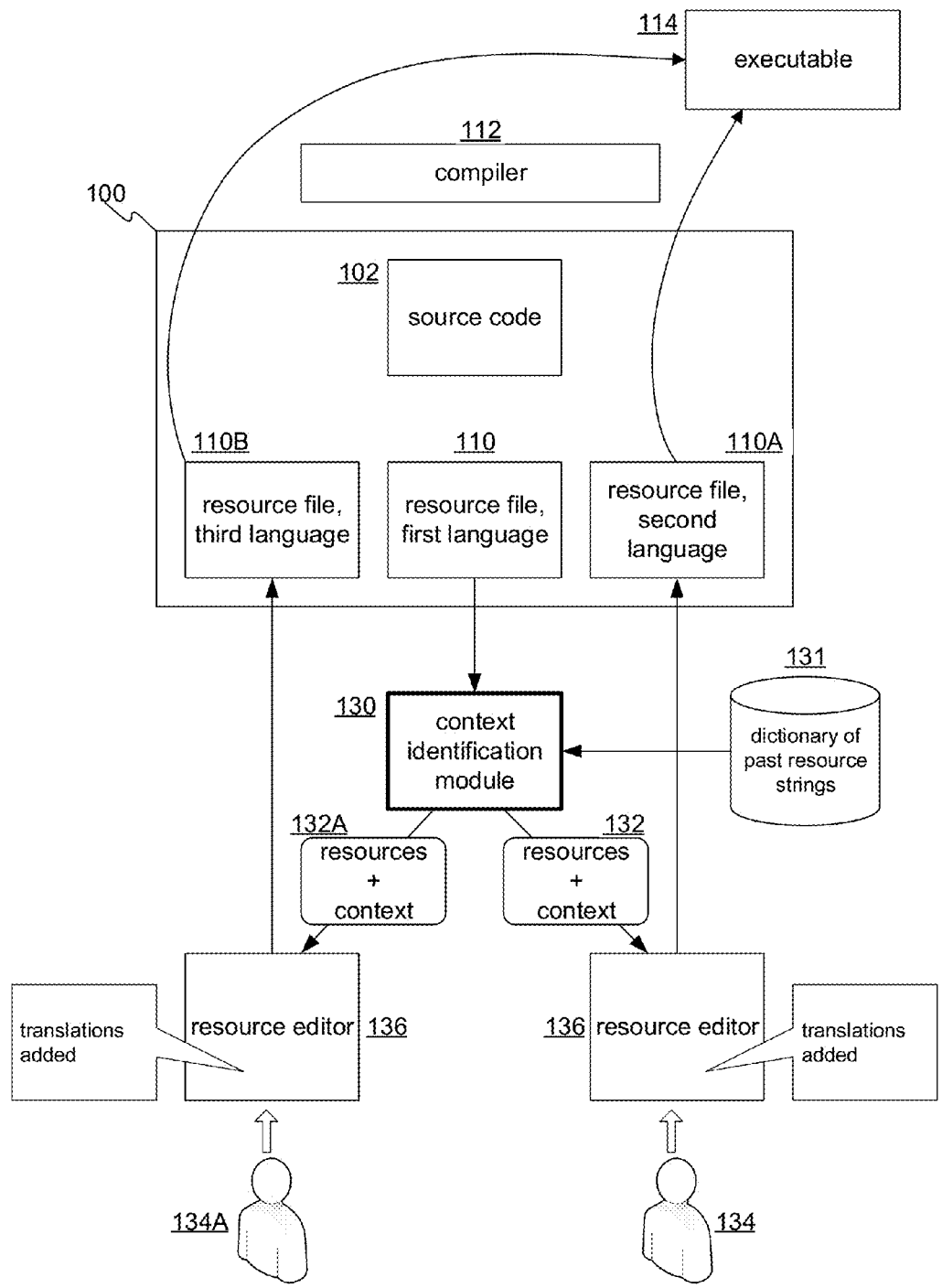
FIG. 2 shows a translation and build workflow that includes a context identification module to automatically generate, from a context dictionary, context information for a target translation file.

FIG. 2 shows a translation and build workflow that includes a context identification module 130 to automatically generate, from a context (or reference) dictionary 131, context information for a target translation file 132. The resource file 110 contains the resource text strings 108 in a source human language, for example English. Before the program project 100 is ready for referencing a target human language (e.g., Spanish), a target resource file 110A in the target language is needed. To that end, a human translator 134 uses a resource editor 136 to produce and edit the target resource file 110A. The target translation file 132 is used by the resource editor 136 to provide context to the human translator 134. If the program project 100 is to be used for yet a third human language, a corresponding target translation file 132A is produced in the same manner by the context identification module 130. The target translation file 132A in the third language is then used to provide context for a corresponding human translator 134A to produce a corresponding resource file 110B with resource strings in the third language. The resource file 110B is then provided with the executable program 114 or its contents are incorporated at compile time, according to the particular implementation.

Whichever the target language, the target translation file 132 is automatically provisioned, by the context identification module 130, with context information to help a human translator 134 decide which translations to provide to the target resource file 110A using a resource editor 136. The context identification module 130 can be a stand-alone application, part of a web-based application that manages translation workflow, a tool in the development environment, a web service, etc.

FIG. 3 shows an example of the context dictionary 131. In one embodiment, the context dictionary 131 maps text strings in the source language to equivalent strings/phrases in the target language. In another embodiment, the context dictionary 131 is only a set of strings in the source language. In yet another embodiment, the context dictionary 131 is a table with columns for various respective languages; each row containing the same string in different languages. In any case, the dictionary strings can come from any corpus of text strings in at least the same human language as the resource text strings in the source resource file 110. In one embodiment, the corpus is a historical database or repository of resource strings from resource files and/or source code files, possibly including translations in one or more languages, collected from perhaps many other program projects. In other words, the context dictionary 131 may be a set of strings previously used in other programs (perhaps selected for some relation to the instant program), and possibly with accompanying previously translated equivalents. Content of the context dictionary 131 may first be cleaned, de-duplicated, etc., when being imported from a repository of prior translations or other context-providing source of text.

Figure 4:
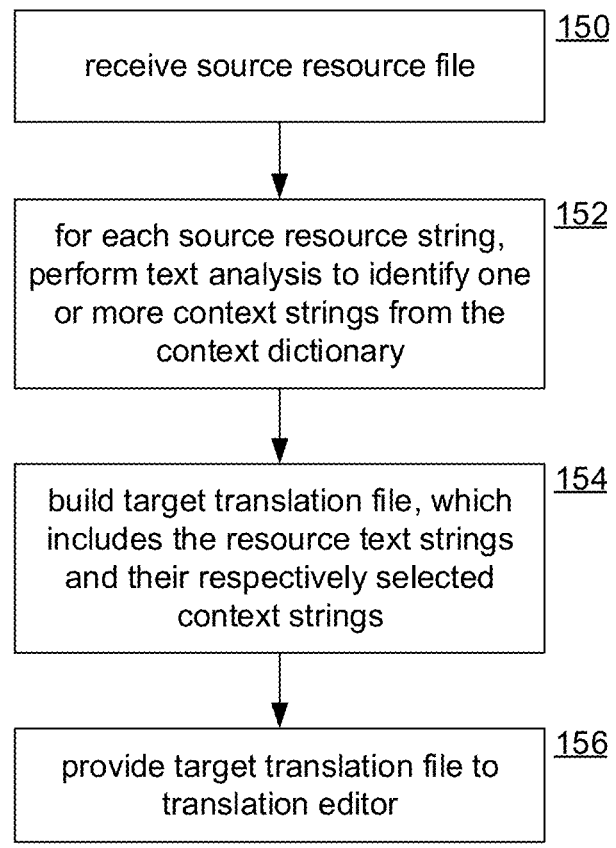
FIG. 4 shows a process performed by one embodiment of the context identification module.

FIG. 4 shows a process performed by one embodiment of the context identification module 130. At step 150 the context identification module 130 receives the source resource file 110 containing resource strings in the source language. The source resource text strings are extracted. At step 152, iterating over the source resource text string, for a source resource string currently being processed, one or more of the strings in the context dictionary 131 identified by the context identification module 130 as being most related in some way (e.g., semantic, textual, or topical similarity) to the current source resource string. At step 154, the target translation file 132 is built storing each of the source resource text strings in association with related strings (in the same language) selected from the context dictionary 131. In other words, context strings are provided for each of the strings for which translation is expected, thus providing textual context for each of the source resource strings. At step 156 the target translation file 132 is provided to the translation or resource editor 136. When translating a given source resource string, the human translator can view the context strings associated with the given source resource string to help inform the translator's decision about what is the best translation to use for the target-language version of the source resource string.

Figure 5:
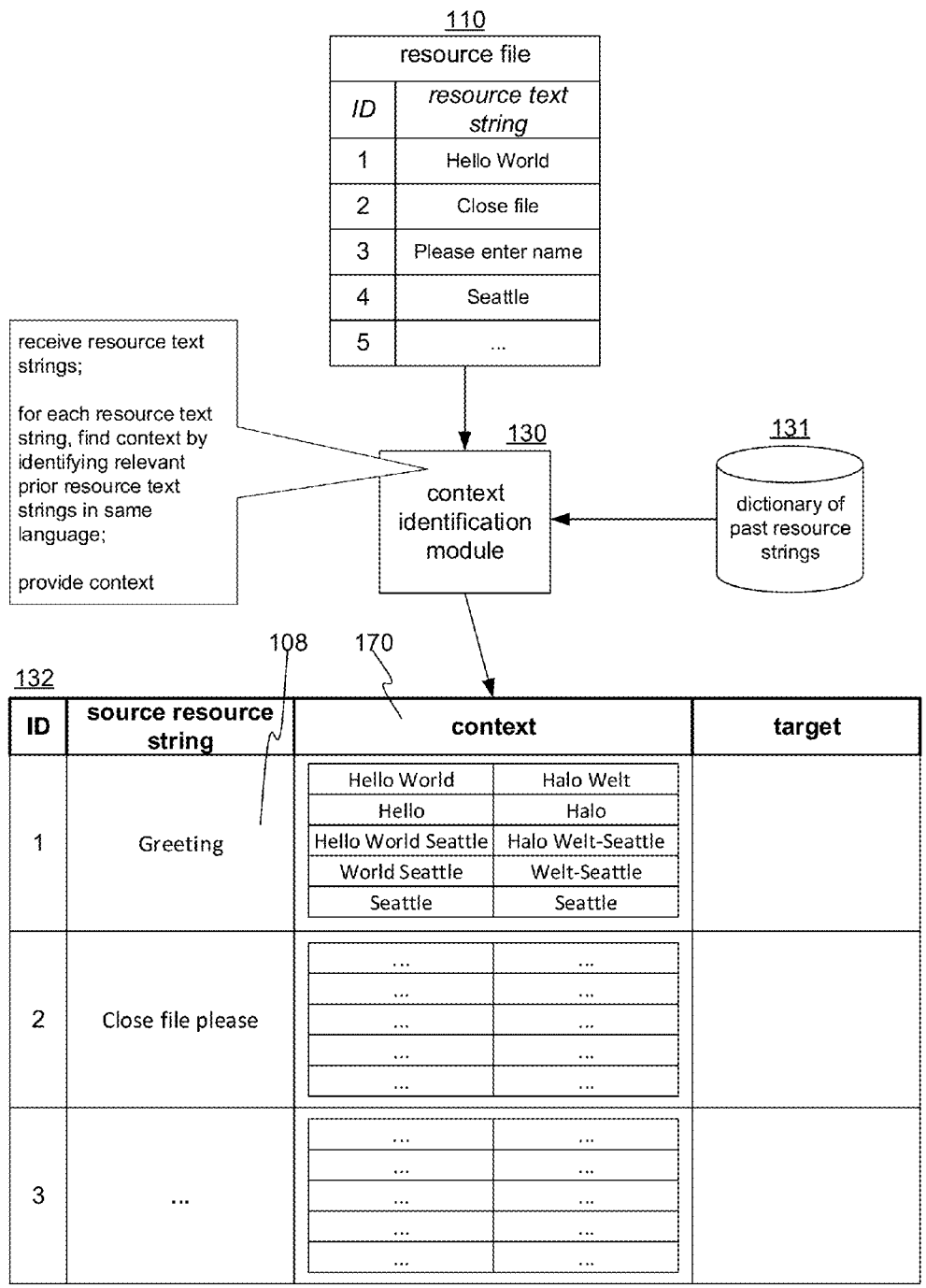
FIG. 5 shows an example of a target translation file with textual context information.

FIG. 5 shows an example of a target translation file 132 with textual context information 170. As noted above, the context identification module 130 receives the resource file 110 in the source language and also accesses the context dictionary 131. For each of the source resource strings in the resource file 110, related or relevant strings are identified in the context dictionary 131. For example, the source resource string "greeting" is found to have five relevant context strings in the context dictionary 131: "hello world", "hello", "hello world Seattle", "world Seattle", and "Seattle", all in the same human language as the source resource strings. Optionally, each of the context strings may also be accompanied by a prior translation thereof (e.g., "halo welt", "halo", etc.), that, as discussed below, can serve as additional context for the human translator, or that can also be selected by the human translator to become the target language translation of the corresponding source resource string. The translation file 132 generated or augmented by the context identification module 130 is then provided to the resource editor 136 to be used by the human translator 134.

Figure 6:
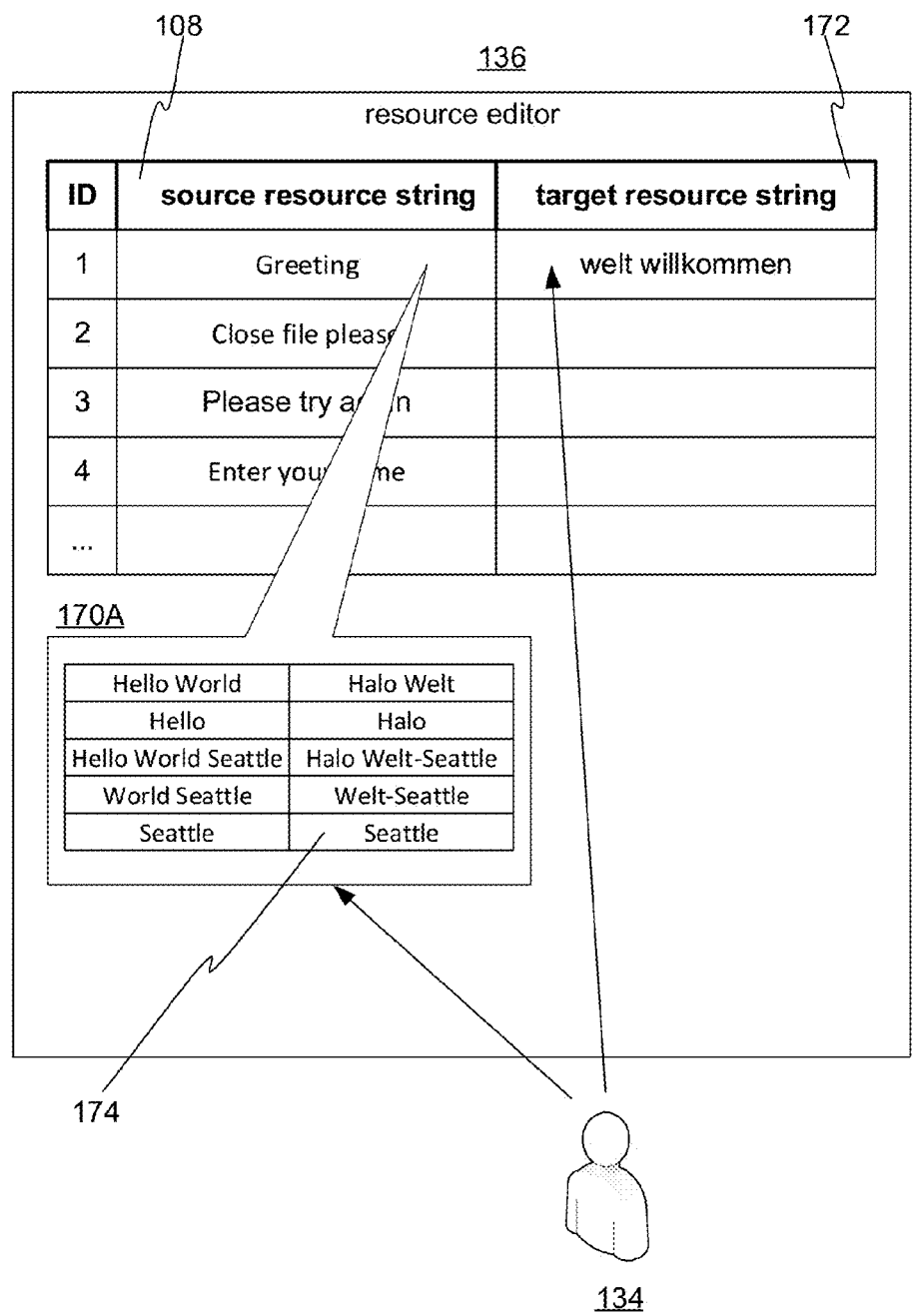
FIG. 6 shows an example of the resource editor.

FIG. 6 shows an example of the resource editor 136. The resource editor 136 can have any type of user interface through which source resource strings 108 can be viewed, and through which the human translator can input or select target resource text strings 172 (translation strings) to be associated with the source resource strings 108. The resource editor 136 can be implemented as a web application, a stand-alone executable application (perhaps packaged with the translation file 132, an ordinary word processor, etc. The user interface of the resource editor 136 also includes some mechanism for displaying context strings in association with their respective source resource strings. In one embodiment, areas where respective source resource strings are displayed can be activated by the user (e.g., by a click, touch, or hover) to display resource-specific context information 170A. In the example shown in FIG. 6, a user has activated the "Greeting" source resource string, causing display of the resource-specific context information 170A for that resource to be displayed. Alternatively, the context information for each respective source resource string can be displayed in a column of the resource editor 136 (like the "context" column shown in FIG. 5). Note that the manner of delivering contextually similar strings to the translator can depend on the editor implementation. Contextually similar strings can be packaged in a handoff file together, as discussed above. Or, contextually similar strings can be served online on-demand, which can be helpful in an online editor scenario where a handoff file might not be needed.

As noted, in one embodiment, the resource-specific context information 170A consists of only strings in the source language. In another embodiment, as shown in FIG. 6, the resource-specific context information 170A also includes prior target-language translations 174 of the respective context strings, which optionally can be selected for designation as the corresponding target resource string. In FIG. 6, although "welt willkommen" is shown as the target resource string (inputted by the human translator 134), "halo welt" could have been selected by a user interaction with the resource-specific context information 170A. In yet another embodiment, the resource editor 136 includes one or more user interface elements to enable the human translator to view context information in any available language.

Resource editor 136 features discussed above need not be implemented by the editor per se. The resource editor 136 can be any known general purpose editor or word processor, and the various ways of enabling display and/or selection of context information can be implemented in the translation file 132 that is provided to the resource editor 136. That is to say, any user interface elements used to display and/or select context information or associated target-language strings can be specified in the translation file 132.

It should be noted that the form and even use of files to exchange information with the human translator 134 is not required. Many techniques can be used to provide the human translator 134 with source resource strings, respective groups of related strings, and means to associate translation strings with the correct resource identifiers. A compiler-consumable target resource file 110A might not be generated until build time. In another embodiment, the resource editor 136 itself implements the context identification module 130 or communicates with an external context identification module 130, obtains context-providing strings, and presents in association with the source resource strings.

Algorithms usable for context identification module 130 will be described next. In one embodiment, a string similarity measuring algorithm can be used. Any of a variety of edit distance measures can be used to measure similarities between source resource strings and strings in the context dictionary 131. A combination of minimum similarity measure and maximum matches can be used to select the strings. For example, for a given source resource string, strings in the context dictionary 131 with a similarity score of 0.9 or higher, and at most five thereof, are selected as context-providing strings.

In another embodiment, a bag-of-words model can be used to rate and select context-providing strings. With this algorithm, iterating over the source resource strings in the relevant resource file 110, the given source resource string is broken into constituent words to form a vector, and then distances of the vector to vectorizations of the strings in the context dictionary 131 are used to select the strings therein that are most statistically significant (closest) to the given source resource string.

A clustering algorithm can be used to find strings in the context dictionary 131 that are correlated with the source resource strings. With this approach, the context dictionary 131 is passed to a clustering algorithm, which forms clusters of the strings using any known clustering algorithm (e.g., K-Means). A source resource string is then passed through the algorithm which, according to the cluster data of the context dictionary 131, places the source resource string in one or several of the clusters. Context-providing strings can then be selected based on proximity to the source resource string in the cluster space. Clusters can be omitted if the source resource string is not sufficiently close to the respective cluster centers. For those clusters in which the source resource string is sufficiently close to the center (i.e., strong cluster membership), dictionary strings in the cluster can be selected as context strings based on how close they are to the source resource string.

In one embodiment, topic modelling is used to select strings. A topic model assumes that any given string can belong to multiple unspecified abstract topics. Topics can be calculated automatically/statistically over the entire context dictionary 131, in a form of unsupervised learning. Given this topic model, each source resource string is vectorized, applied to the model, and given scores for various of the abstract topics. The Latent Dirichlet Allocation algorithm is a known implementation of a topic model that is suitable for use. Details are available in "Latent Dirichlet Allocation" (Journal of Machine Learning Research 3 (4-5), pp. 993-1022; by Blei, Ng, and Jordan).

Consider a hypothetical example (values not actually computed). Using a topic model, if an input string has the words "hello", "world", and "Seattle", then the strings represented by a topic vector might be, for example:
String A=[Topic1 (30%), Topic2 (60%), Topic3(5%), Topic4 (5%)], and
String B=[Topic1 (40%), Topic2 (60%), 0, 0], and
where
Topic1=["Hello" (30%), "World" (40%), Seattle (30%)],
Topic2=["Hello" (20%), "World" (50%), Seattle (30%)],
Topic3=["Hello" (40%), "World" (40%), Seattle (20%)], and
Topic4=["Hello" (30%), "World" (50%), Seattle (20%)].
To calculate the distance between pairwise topic vectors, any type of distance measure may be used, including, for example: Euclidean distance, Cosine similarity, Hellinger distance, or Kullback-Leibler divergence. For each input source resource string, the top-N closest strings can be selected.

Figure 7:
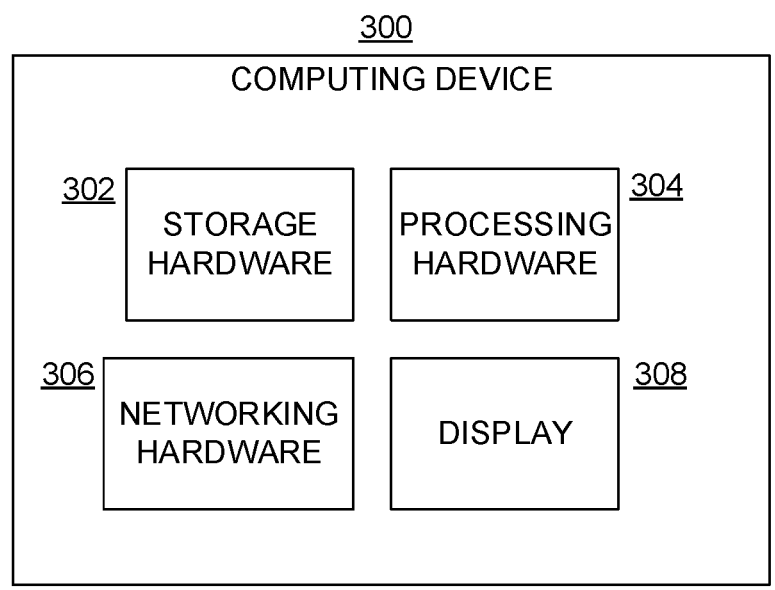
FIG. 7 shows an example of a computing device.

FIG. 7 shows an example of a computing device 300. One or more such computing devices are configurable to implement embodiments described above. The computing device 300 comprises storage hardware 302, processing hardware 304, networking hardware 306 (e.g. network interfaces, cellular networking hardware, etc.). The processing hardware 304 can be a general purpose processor, a graphics processor, and/or other types of processors. The storage hardware can be one or more of a variety of forms, such as optical storage (e.g., compact-disk read-only memory (CD-ROM)), magnetic media, flash read-only memory (ROM), volatile memory, non-volatile memory, or other hardware that stores digital information in a way that is readily consumable by the processing hardware 304. The computing device 300 may also have a display 308, and one or more input devices (not shown) for users to interact with the computing device 300.

The embodiments described above can be implemented by information in the storage hardware 302, the information in the form of machine executable instructions (e.g., compiled executable binary code), source code, bytecode, or any other information that can be used to enable or configure the processing hardware to perform the various embodiments described above. The details provided above will suffice to enable practitioners of the invention to write source code corresponding to the embodiments, which can be compiled/ translated and executed.

The invention claimed is:

1. A method comprising:
   accessing, by the processing hardware, resource strings stored in the storage hardware, the resource strings each comprising respective text in a source human language, the resource strings having been obtained from a resource file of a source code project, the source code project comprising references to the resource strings that are configured to be used to compile the source code project;
   accessing, by the processing hardware, a corpus of strings each comprising respective text in the source human language;
   performing, by the processing hardware, text analysis on the resource strings and the corpus of strings to select and associate a string for each of the respective text strings, the selected strings selected based on being determined to be contextually related to the respective resource strings, the selected strings comprising strings in the source human language;
   storing the selected strings in association with the respective resource strings;
   providing a translation file to an editor executed by the processing hardware, the translation file storing the selected strings in association with the resource strings, wherein the editor is configured to display, based on the associations in the translation file, the selected strings in association with the respective resource strings;
   receiving target resource strings from a user interface of the editor, the target resource strings comprising respective text in a target human language that is not the source human language; and
   adding the target resource strings to the source code project in the storage hardware.

2. A method according to claim 1, further comprising:
   providing a translation file to an editor, the translation file storing the selected strings in association with the resource strings; and
   receiving target resource strings entered by a human translator using the editor, the target resource strings comprising respective text in a target human language that is not the source human language.

3. A method according to claim 2, wherein the editor displays a selected string in association with a resource string.

4. A method according to claim 1, wherein the strings comprise contextually similar strings selected based on determinations of context similarity to the target resource strings.

5. A method according to claim 1, wherein the text strings in the corpus comprise strings previously used on other source code projects.

6. A method according to claim 1, wherein the text analysis is performed by an algorithm that scores each of the resource text strings with respect to a respective set of the strings, wherein the strings are selected based on the scores.

7. A method according to claim 6, wherein the scores correspond to determinations, with respect to the resource text strings, of textual, semantic, or topical similarity as determined by the algorithm.

8. A method comprising:
   displaying a graphical user interface on a display of a computing device, the graphical user interface displaying a resource text string, a historical resource text string displayed in association with the displayed resource text string, and an input element, wherein the historical resource text string was automatically selected, based on a determination of contextual similarity with the resource text string, from a corpus of historical resource text strings obtained from software projects that included the historical resource text strings as resources thereof, and wherein the historical resource text strings and the resource text string are comprised of one or more words in a first human language;
   receiving, via the input element, a target resource text string inputted according to a user input directed to the graphical user interface, wherein the target resource text string comprises one or more words in a second human language inputted while the resource string and the historical resource string are displayed in association with each; and
   including the target resource text string in a resource file of a program project, the target resource text string referenced in a source code file of the program project.

9. A method according to claim 8, further comprising:
   training a machine learning model with the corpus of historical resource text strings, and applying the resource text string to the machine learning model to obtain the historical resource text string.

10. A method according to claim 9, wherein the machine learning model comprises a topic model that maps strings to vectors of abstract topics.

11. A method according to claim 8, the graphical user interface further displaying, in association with the historical resource text string, a second historical resource text string in the second human language.

12. A method according to claim 8, further comprising providing a resource file and historical text strings to a context identification module, the context identification module computing scores for the resource strings in the resource file and selecting historical resource text strings, including the historical resource text string.

13. A method according to claim 8, further comprising using the resource file to compile the program project.

14. One or more computing devices comprising:
   processing hardware;
   storage hardware storing instructions that when executed by the processing hardware cause the processing hardware to perform a process comprising:
   accessing resource text strings obtained from a resource file of a program project, wherein the resource text strings are referenced in a source code file of the program project, wherein the program project is configured to be compiled to produce a corresponding program, and wherein the resource text strings are in a first human language;
   accessing a dictionary of historical resource text strings, wherein the historical resource text strings have been obtained from resource files of respective other program projects, and wherein the historical resource text strings are in the first human language;
   for each resource text string, selecting one or more of the historical resource text strings based on the resource text strings by determining similarity between the resource text string and the corresponding selected one or more historical resource text strings;
   storing, in a file, the resource text strings in association with respective selected historical resource text strings;
   providing the file to an editor of a computing device operated by a human translator, the editor concurrently displaying a resource text string in the first human language and, based on association in the file with the resource text string in the first human language, one or more historical resource text strings in the first human language determined to be similar to the resource text string; and receiving translation strings, in a second human language, the translation strings received from a user interface of the editor and corresponding to human translations associated with the file, the translation strings including a translation string in the second human language that corresponds to the displayed resource string in the first human language.

15. One or more computing devices according to claim 14, the process further comprising adding a new resource file to the program project, the new resource file comprised of the translation strings, the translation strings and the resource text strings associated with and referenced by same respective identifiers in the source code file.

16. One or more computing devices according to claim 14, wherein the selecting comprises, for a given resource text string, computing distance scores of the given resource text string to respective historical resource text strings in a set of the historical resource text strings.

17. One or more computing devices according to claim 16, wherein the selecting further comprises:
   determining that the given resource text string is related to the set of the historical resource text strings; and
   selecting one or more of the historical resource text strings in the set based on the scores.

18. One or more computing devices according to claim 17, the process further comprising applying a topic model to generate sets of topically related sets of the historical resource strings, the sets including the set.

19. One or more computing devices according to claim 14, wherein the selecting is performed with a text similarity algorithm.

20. One or more computing devices according to claim 14, wherein the selecting is performed with a machine learning algorithm trained according to the historical resource text strings.

* * * * *